US011012202B2

(12) United States Patent
Aboul-Magd et al.

(10) Patent No.: US 11,012,202 B2
(45) Date of Patent: *May 18, 2021

(54) SYSTEM AND METHOD FOR WLAN OFDMA DESIGN OF SUBCARRIER GROUPS AND FRAME FORMAT

(71) Applicant: Huawei Technologies Co., Ltd., Shenzhen (CN)

(72) Inventors: Osama Aboul-Magd, Kanata (CA); Jung Hoon Suh, Kanata (CA); Kwok Shum Au, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/731,893

(22) Filed: Dec. 31, 2019

(65) Prior Publication Data

US 2020/0136769 A1    Apr. 30, 2020

Related U.S. Application Data

(63) Continuation of application No. 15/685,722, filed on Aug. 24, 2017, now Pat. No. 10,567,126, which is a (Continued)

(51) Int. Cl.
*H04L 5/00* (2006.01)
*H04W 74/08* (2009.01)
(Continued)

(52) U.S. Cl.
CPC .......... *H04L 5/0007* (2013.01); *H04L 5/0055* (2013.01); *H04L 5/0091* (2013.01); (Continued)

(58) Field of Classification Search
CPC ....... H04L 5/0007; H04L 5/14; H04L 5/0055; H04L 5/0091; H04L 5/1438; (Continued)

(56) References Cited

U.S. PATENT DOCUMENTS 7,355,962 B2    4/2008  Li et al.
7,567,625 B2    7/2009  Oh et al.
(Continued)

FOREIGN PATENT DOCUMENTS

CN    1790962 A    6/2006
CN    1812353 A    8/2006
(Continued)

OTHER PUBLICATIONS

3GPP TS 36.211, "3rd Generation Partnership Project; Technical Specification Group Radio Access Network; Evolved Universal Terrestrial Radio Access (E-UTRA); Physical channels and modulation (Release 11)," v11.5.0, 120 pages, Dec. 2013.
(Continued)

*Primary Examiner* — Tejis Daya
(74) *Attorney, Agent, or Firm* — Slater Matsil, LLP

(57) ABSTRACT

Embodiments are provided for WLAN Orthogonal Frequency Division Multiple Access (OFDMA) design of subcarrier groups and corresponding frame format. An embodiment method includes grouping a plurality of subcarriers for OFDMA transmissions into a plurality of subcarrier groups in accordance with a pre-defined grouping structure for subcarriers. The method further includes allocating the subcarrier groups to a plurality of corresponding users, and signaling, to the users, a map of the subcarrier groups to the corresponding users. According to the pre-defined grouping structure, each one of the subcarrier groups includes a plurality of consecutive subcarriers, a plurality of non-consecutive subcarriers, or a combination of consecutive and non-consecutive subcarriers according to a deterministic structure. The map is signaled using an OFDMA PPDU comprising a legacy preamble portion configured to silence legacy users that do not use OFDMA communications, an OFDMA preamble portion indicating the map, and a data portion.

24 Claims, 4 Drawing Sheets

Related U.S. Application Data continuation of application No. 14/325,136, filed on Jul. 7, 2014, now Pat. No. 9,755,795.

(60) Provisional application No. 61/917,791, filed on Dec. 18, 2013.

(51) Int. Cl.
    *H04L 5/14*         (2006.01)
    *H04W 72/04*     (2009.01)
    *H04W 84/12*     (2009.01)
    *H04L 27/26*     (2006.01)

(52) U.S. Cl.
    CPC ........... *H04L 5/14* (2013.01); *H04W 72/0446* (2013.01); *H04W 74/0816* (2013.01); *H04L 5/1438* (2013.01); *H04L 27/2602* (2013.01); *H04L 27/2656* (2013.01); *H04W 84/12* (2013.01)

(58) Field of Classification Search
    CPC ........... H04L 27/2602; H04L 27/2656; H04W 74/0816; H04W 72/0446; H04W 84/12
    See application file for complete search history.

(56) References Cited

U.S. PATENT DOCUMENTS

| | | |
|---|---|---|
| 8,254,945 B2 | 8/2012 | Lee |
| 8,379,590 B2 | 2/2013 | Hooli |
| 8,886,755 B1 | 11/2014 | Liu et al. |
| 9,585,058 B2 | 2/2017 | Seok et al. |
| 9,755,795 B2 | 9/2017 | Aboul-Magd et al. |
| 9,794,032 B2 | 10/2017 | Kang et al. |
| 9,935,805 B2 * | 4/2018 | Jones, IV ............ H04L 27/2613 |
| 2004/0001429 A1 | 1/2004 | Ma et al. |
| 2004/0190640 A1 | 9/2004 | Dubuc et al. |
| 2005/0013279 A1 | 1/2005 | Hwang et al. |
| 2005/0128993 A1 * | 6/2005 | Yu ........................ H04B 7/061 |
| | | 370/342 |
| 2005/0163094 A1 | 7/2005 | Okada et al. |
| 2005/0201476 A1 | 9/2005 | Kim et al. |
| 2005/0232181 A1 | 10/2005 | Park et al. |
| 2005/0259686 A1 | 11/2005 | Lewis |
| 2006/0007484 A1 | 1/2006 | Tanimoto |
| 2006/0007849 A1 | 1/2006 | Kim et al. |
| 2006/0109814 A1 | 5/2006 | Kuzminskiy et al. |
| 2006/0165188 A1 | 7/2006 | Wunder et al. |
| 2006/0209669 A1 | 9/2006 | Nishio |
| 2007/0076639 A1 | 4/2007 | Chou |
| 2007/0140102 A1 | 6/2007 | Oh et al. |
| 2007/0223422 A1 | 9/2007 | Kim et al. |
| 2007/0248046 A1 | 10/2007 | Khan |
| 2008/0013599 A1 | 1/2008 | Malladi |
| 2008/0049690 A1 | 2/2008 | Kuchibhotla et al. |
| 2008/0080630 A1 * | 4/2008 | Sung ..................... H04L 25/023 |
| | | 375/260 |
| 2008/0109711 A1 | 5/2008 | Morioka et al. |
| 2008/0117867 A1 | 5/2008 | Yin et al. |
| 2008/0123616 A1 | 5/2008 | Lee |
| 2008/0153506 A1 | 6/2008 | Yin |
| 2008/0227475 A1 | 9/2008 | Suemitsu et al. |
| 2008/0232487 A1 | 9/2008 | Cleveland et al. |
| 2008/0240275 A1 | 10/2008 | Cai |
| 2008/0273606 A1 | 11/2008 | Orfanos et al. |
| 2009/0034526 A1 | 2/2009 | Ahmadi et al. |
| 2009/0141681 A1 | 6/2009 | Hwang et al. |
| 2009/0175260 A1 | 7/2009 | Wang et al. |
| 2009/0252110 A1 | 10/2009 | Sridhara |
| 2009/0285163 A1 | 11/2009 | Zhang et al. |
| 2009/0310692 A1 | 12/2009 | Kafle et al. |
| 2010/0046457 A1 | 2/2010 | Abraham et al. |
| 2010/0046482 A1 | 2/2010 | Sridhara et al. |
| 2010/0054194 A1 * | 3/2010 | Chauncey ............ H04L 5/0007 |
| | | 370/329 |
| 2010/0074198 A1 | 3/2010 | Morioka |
| 2010/0098016 A1 | 4/2010 | Murakami et al. |
| 2010/0113043 A1 | 5/2010 | Hsuan |
| 2010/0135495 A1 | 6/2010 | Chion et al. |
| 2010/0172316 A1 | 7/2010 | Hwang et al. |
| 2010/0173651 A1 | 7/2010 | Park et al. |
| 2010/0189069 A1 | 7/2010 | Sahinoglu et al. |
| 2010/0202545 A1 | 8/2010 | Lim et al. |
| 2010/0214992 A1 | 8/2010 | Hart et al. |
| 2011/0038332 A1 | 2/2011 | Liu et al. |
| 2011/0142020 A1 * | 6/2011 | Kang .................... H04W 99/00 |
| | | 370/338 |
| 2011/0222504 A1 * | 9/2011 | Ma ....................... H04L 27/2613 |
| | | 370/330 |
| 2011/0261708 A1 | 10/2011 | Grandhi |
| 2011/0261742 A1 | 10/2011 | Wentink |
| 2011/0299468 A1 | 12/2011 | Van Nee et al. |
| 2012/0063433 A1 | 3/2012 | Wentink |
| 2012/0087348 A1 | 4/2012 | Wentink |
| 2012/0177017 A1 | 7/2012 | Gong |
| 2012/0177144 A1 | 7/2012 | Lee et al. |
| 2012/0244623 A1 | 9/2012 | Patel |
| 2012/0327915 A1 * | 12/2012 | Kang .................... H04L 5/0007 |
| | | 370/336 |
| 2013/0010664 A1 | 1/2013 | Kang et al. |
| 2013/0058273 A1 | 3/2013 | Wentink et al. |
| 2013/0100922 A1 | 4/2013 | Ahn et al. |
| 2013/0107912 A1 | 5/2013 | Ponnampalam |
| 2013/0136075 A1 * | 5/2013 | Yu ...................... H04W 72/0453 |
| | | 370/329 |
| 2013/0177098 A1 | 7/2013 | Jung et al. |
| 2013/0208715 A1 | 8/2013 | Roh et al. |
| 2013/0223210 A1 | 8/2013 | Asterjadhi et al. |
| 2013/0279382 A1 | 10/2013 | Park et al. |
| 2013/0286959 A1 | 10/2013 | Lou |
| 2013/0301551 A1 | 11/2013 | Ghosh et al. |
| 2013/0329658 A1 | 12/2013 | Liu |
| 2013/0336234 A1 | 12/2013 | Ghosh et al. |
| 2014/0241240 A1 | 8/2014 | Kloper et al. |
| 2014/0247824 A1 | 9/2014 | Sohn et al. |
| 2014/0307653 A1 | 10/2014 | Liu et al. |
| 2014/0314056 A1 | 10/2014 | Park et al. |
| 2014/0369276 A1 | 12/2014 | Porat et al. |
| 2014/0369333 A1 * | 12/2014 | Porat ................... H04L 5/0007 |
| | | 370/338 |
| 2015/0029979 A1 | 1/2015 | Onodera et al. |
| 2015/0063190 A1 | 3/2015 | Merlin et al. |
| 2015/0063233 A1 | 5/2015 | Choi et al. |
| 2015/0124689 A1 | 5/2015 | Merlin et al. |
| 2015/0124690 A1 | 5/2015 | Merlin et al. |
| 2015/0131517 A1 | 5/2015 | Chu et al. |
| 2015/0131627 A1 | 5/2015 | Wentink |
| 2015/0146654 A1 | 5/2015 | Chu et al. |
| 2015/0146808 A1 | 5/2015 | Chu et al. |
| 2015/0163028 A1 | 6/2015 | Tandra et al. |
| 2015/0172012 A1 | 6/2015 | Abeysekera et al. |
| 2015/0173070 A1 | 6/2015 | Aboul-Magd et al. |
| 2015/0244619 A1 | 8/2015 | Zheng et al. |
| 2015/0382333 A1 | 12/2015 | Seok |
| 2016/0081024 A1 | 3/2016 | Gokturk et al. |
| 2016/0099798 A1 | 4/2016 | Chu et al. |
| 2016/0135224 A1 | 5/2016 | Lee et al. |
| 2016/0143010 A1 | 5/2016 | Kenney et al. |
| 2018/0048573 A1 | 2/2018 | Merlin et al. |

FOREIGN PATENT DOCUMENTS

| | | |
|---|---|---|
| CN | 101094027 A | 12/2007 |
| CN | 101102245 A | 1/2008 |
| CN | 101136894 A | 3/2008 |
| CN | 101175039 A | 5/2008 |
| CN | 102301807 A | 12/2011 |
| CN | 102656941 A | 9/2012 |
| CN | 102696210 A | 9/2012 |
| CN | 103166896 A | 6/2013 |
| CN | 103227765 A | 7/2013 |
| CN | 103404187 A | 11/2013 |
| EP | 2697923 A1 | 2/2014 |

(56) References Cited

FOREIGN PATENT DOCUMENTS

| | | |
|---|---|---|
| EP | 2830246 A1 | 1/2015 |
| JP | 2005024447 A | 1/2005 |
| JP | 2006504367 A | 2/2006 |
| JP | 2008010904 A | 1/2008 |
| JP | 2008252867 A | 10/2008 |
| JP | 2010171979 A | 8/2010 |
| JP | 2012516662 A | 7/2012 |
| JP | 2013530580 A | 7/2013 |
| JP | 2013201472 A | 10/2013 |
| JP | 2013542643 A | 11/2013 |
| JP | 2016532388 A | 10/2016 |
| JP | 2016533136 A | 10/2016 |
| WO | 2009147570 A1 | 12/2009 |
| WO | 2012142481 A1 | 10/2012 |
| WO | 2012158557 A1 | 11/2012 |
| WO | 2012158959 A1 | 11/2012 |
| WO | 2013055117 A2 | 4/2013 |

OTHER PUBLICATIONS

3GPP TS 36.213, "3rd Generation Partnership Project; Technical Specification Group Radio Access Network; Evolved Universal Terrestrial Radio Access (E-UTRA); Physical layer procedures (Release 10)," v10.11.0, 127 pages, Dec. 2013.

3GPP TS 36.321, "3rd Generation Partnership Project; Technical Specification Group Radio Access Network; Evolved Universal Terrestrial Radio Access (E-UTRA); Medium Access Control (MAC) protocol specification (Release 10)," V10.9.0, 54 pages, Jun. 2013.

IEEE, "IEEE Standard for Information technology—Telecommunications and information exchange between systems Local and metropolitan area networks—Specific requirements, Part 11: Wireless LAN Medium Access Control (MAC) and Physical Layer (PHY) Specifications," IEEE Std 802.11-2012 (Revision of IEEE Std 802.11-2007). 2793 pages.

Chun, et al., "Legacy Suport on HEW frame structure," IEEE 11-13/1057r0, Sep. 2013, 8 pages.

Chun, et al., "Uplink multi-user transmission," IEEE 11-13/1388r0, Nov. 11, 2013, 19 pages.

Hart, Brian, et al., "DL-OFDMA for Mixed Clients," IEEE 802.11-10/0317r1, Cisco Systems, Mar. 2010, 24 pages.

Ferdous, H.S. et al., "Enhanced IEEE 802.11 by Integrating Multiuser Dynamic OFDMA," 2010 Wireless Telecommunications Symposium (WTS), Apr. 2010, pp. 1-6, Tampa Florida.

Haile, G. et al., "C-OFDMA: Improved Throughput for Next Generations WLAN Systems Based on OFDMA and CSMA/CA," 2013 4th International Conference on Intelligent Systems, Modeling and Simulation, Jan. 2013, pp. 497-507, Bangkok.

IEEE, Part 11: Wireless LAN Medium Access Control (MAC) and Physical Layer (PHY) Specifications, IEEE 802.11-2012, Mar. 29, 2012, 2,793 pages.

IEEE, Part 11: Wireless LAN Medium Access Control (MAC) and Physical Layer (PHY) Specifications, Amendment 4: Enhancements for Very High Throughput for Operation in Bands below 6 GHz., IEEE 802.11ac-2013, Dec. 11, 2013, 425 pages.

Inoue, et al., "Improved Spectrum Efficiency for the Next Generation WLANs," IEEE 802.11-12/0820r0, Jul. 2012, 18 pages.

Jung, J. et al., "Group Contention-Based OFDMA MAC Protocol for Multiple Access Interference-Free in WLAN Systems," IEEE Transactions on Wireless Communications, Feb. 2012, pp. 648-658, vol. 11, No. 2.

Lichte, et al., "Integrating multiuser dynamic OFDMA into IEEE 802.11a and prototyping it on a real-time software-defined radio testbed," Testsbeds and Research Infrastructure for the Development of Networks a ND Communities, 2007, 3rd International Conference May 1, 2007, 9 pages.

Gross, James, et al., "OFDMA Related Issues in VHTL6," IEEE 802.11 07/206r1, RWTH Aachen—TU Berlin, Jan. 21, 2009, 17 pages.

Qayyum, et al., "Performance increase in CSMA/CA with RTS-CTS," Proceedings IEEE INMIC Dec. 8, 2003, 4 pages.

Ranjha, B., et al., "Interferences Analysis of Interleaved and Localized Mapping Schemes in OFDMA System With Carrier Frequency Offset," IEEE Military Communications Conference, Oct. 29, 2012-Nov. 1, 2012, 6 pages, Orlando, FL.

Srinivasan, et al., "IEEE 802.16m System Description Document (SDD)," IEEE 802.16M-09/0034r2, Sep. 24, 2009, 163 pages.

Valentin, et al., "Intergrating multiuser dynamic OFDMA intoIEEE 802.11 WLANs—LLC/MAC extensions and system performance," IEEE May 19, 2008, 7 pages.

Wang, F., et al., "Adaptive Slot and Bit Allocation Method for OFDMA Transmission Systems," 2006 International Symposium on Intelligent Signal Processing and Communications, Dec. 12-15, 2006, 4 pages, Yonago.

Zheng, et al., "Wireless Networking Complete," In "Wireless Networking Complete," Aug. 2009, 22 pages.

\* cited by examiner

SYSTEM AND METHOD FOR WLAN OFDMA DESIGN OF SUBCARRIER GROUPS AND FRAME FORMAT

CROSS-REFERENCE TO RELATED APPLICATIONS

This application is a continuation of U.S. application Ser. No. 15/685,722, filed on Aug. 24, 2017, now U.S. Pat. No. 10,567,126, which is a continuation of U.S. application Ser. No. 14/325,136, filed on Jul. 7, 2014, now U.S. Pat. No. 9,755,795, which claims the benefit of U.S. Provisional Application No. 61/917,791, filed on Dec. 18, 2013, which applications are hereby incorporated herein by reference.

TECHNICAL FIELD

The present invention relates to network communications, and, in particular embodiments, to a system and method for Orthogonal Frequency Division Multiple Access (OFDMA) design of subcarrier groups and frame format.

BACKGROUND

Wireless Local Area Networks (WLANs) commonly operate in unlicensed spectrum bands. Rules for operation in these bands force competing devices to share the available resources and defer their intended transmissions when the medium is sensed busy. Typically, a WLAN uses an Orthogonal Frequency Division-Multiplexing (OFDM) transmission format in which all transmission resources are assigned to a single device. Random assignment is commonly achieved using carrier sense multiple access with collision avoidance (CSMA/CA). With CSMA/CA a device wins access to the medium, transmits its data up to a pre-defined period of time, and then gives up the medium for other devices to compete for transmission. In contrast, Orthogonal Frequency Division Multiple Access (OFDMA) is a transmission and access mechanism that accommodates multiple-user transmissions simultaneously. OFDMA is commonly implemented in wireless infrastructures operating in the licensed bands in order to meet timing information in terms of frame structure and the scheduling of resources among a subset of users. There is a need for efficient schemes for implementing OFDMA in WLANs.

SUMMARY

In accordance with an embodiment, a method by a network component for provisioning subcarriers to users for Orthogonal Frequency Division Multiple Access (OFDMA) communications in a Wireless Local Area Network (WLAN) includes grouping a plurality of subcarriers for OFDMA transmissions into a plurality of subcarrier groups. The grouping and the subcarrier groups are in accordance with a pre-defined grouping structure for subcarriers. The method further includes allocating the subcarrier groups to a plurality of corresponding users, and signaling, to the users, a map of the subcarrier groups to the corresponding users.

In accordance with another embodiment, a method by a network component for allocating subcarriers to users for OFDMA communications in a WLAN includes establishing a plurality of subcarrier groups for a plurality of stations (STAs) according to a defined and deterministic grouping structure for the subcarrier groups, and allocating the subcarrier groups to the STAs. The method further includes establishing a plurality of user groups. Each one of the user groups represents a sequence of the STAs. The allocated subcarrier groups are associated with a user group of the user groups. A sequence of the allocated subcarrier groups with the user group are then sent to the STAs. The sequence of the STAs of the user group is mapped one to one to the sequence of the allocated subcarrier groups.

In accordance with another embodiment, a network component for provisioning subcarriers to users for OFDMA communications in a WLAN comprises a processor and a computer readable storage medium storing programming for execution by the processor. The programming includes instructions to group a plurality of subcarriers for OFDMA transmissions into a plurality of subcarrier groups. The grouping and each one of the subcarrier groups are in accordance with a pre-defined grouping structure for subcarriers. The programming further includes instructions to allocate the subcarrier groups to a plurality of corresponding users, and signal, to the users, a map of the subcarrier groups to the corresponding users.

In accordance with another embodiment, a method by a user device supporting OFDMA communications in a WLAN includes receiving an indication of a plurality of subcarrier groups grouping a plurality of corresponding subcarriers for OFDMA transmissions. Each one of the subcarrier groups comprises one or more of the subcarriers. The method further includes receiving an allocation of one of the subcarrier groups to the user device, and exchanging OFDMA transmissions on one or more subcarriers belonging to one of the subcarrier groups allocated to the user device.

In accordance with yet another embodiment, a user device supporting OFDMA communications in a WLAN comprises a processor and a computer readable storage medium storing programming for execution by the processor. The programming includes instructions to receive an indication of a plurality of subcarrier groups grouping a plurality of corresponding subcarriers for OFDMA transmissions. Each one of the subcarrier groups comprises one or more of the subcarriers. The programming includes further instructions to receive an allocation of one of the subcarrier groups to the user device, and exchange OFDMA transmissions on one or more subcarriers belonging to one of the subcarrier groups allocated to the user device.

The foregoing has outlined rather broadly the features of an embodiment of the present invention in order that the detailed description of the invention that follows may be better understood. Additional features and advantages of embodiments of the invention will be described hereinafter, which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Disclosed herein are system and method embodiments for WLAN OFDMA design of subcarrier groups and corresponding frame format. The OFDMA design includes the arrangement of the OFDMA subcarriers into groups and the allocation of groups to different users using a frame format designed for this purpose. A low-overhead method is also included for allocating the subcarriers to different users by grouping the subcarriers into subcarrier groups.

Figure 1:
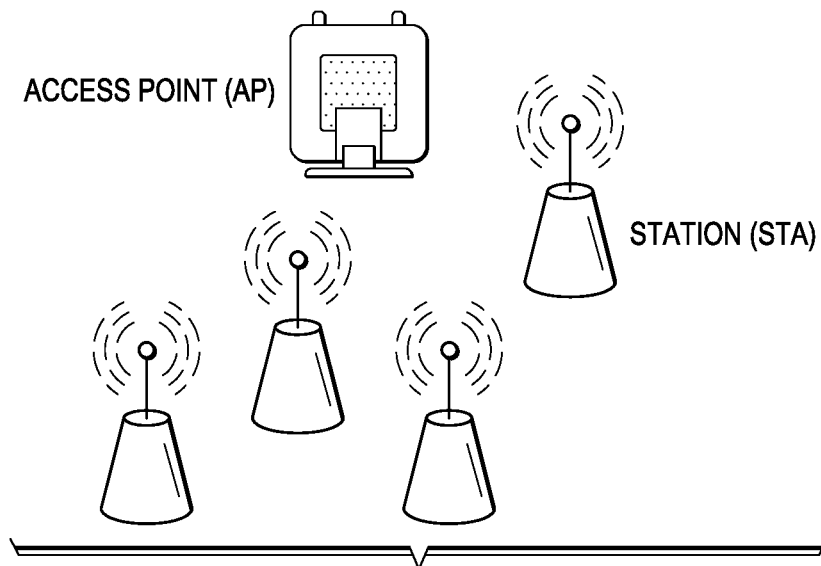
FIG. 1 illustrates a WLAN basic service set (BSS)

FIG. 1 shows an example of a WLAN basic service set (BSS) including an access point (AP) and one or more stations (STAs). The AP is a communication device allowing the STAs to access and communicate with the WLAN. The STAs are any user communication devices allowing users or subscriber to communicate with the AP and hence the WLAN. Examples of STAs include smartphones, tablet computers, laptop computers, desktop computers, sensor devices (e.g., smartwatch), and other mobile or communication devices with WLAN (e.g., WiFi) capability.

In general, an OFDMA system consists of an integer number of subcarriers, $N_{sc}$, defined in a channel of certain bandwidth, W Megahertz (MHz). Each subcarrier represents a sub-range bandwidth or a frequency channel that can be used for uplink and/or downlink transmissions. For example in WLAN, the bandwidth W is usually set to 20 MHz. The subcarrier separation $\Delta f$ is given by $\Delta f = W/N_{sc}$. The OFDMA symbol duration $T_s$ is given by $1/\Delta f$. The quantity $N_{sc}$ is set at 64 in WLAN OFDM implementation. With the introduction of OFDMA to WLAN, $N_{sc}$ may be set to a higher value, such as 256 or 512 to achieve finer granularity. During each OFDMA transmission (uplink or downlink), a number of subcarriers are allocated to each of the users participating in the transmission.

Figure 2:
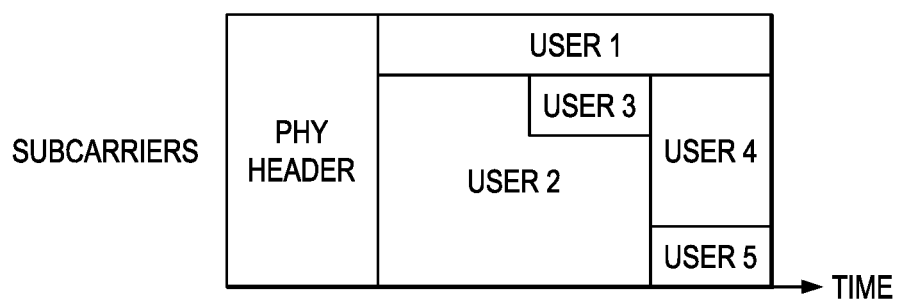
FIG. 2 illustrates an example of typical assignment of subcarriers to users in OFDMA.

FIG. 2 shows an example of a typical assignment of subcarriers to users for general OFDMA transmission. Multiple users are multiplexed in the frequency domain by assigning a number of subcarriers to each user. The assignment of subcarriers to each user may be random or in a non-orderly fashion as shown. The assignment is performed without a defined grouping logic of subcarriers assigned to a user, in other words without defined structure for grouping the subcarriers for a user. An assignment of the form shown in FIG. 2 is usually referred to as the map. The map needs to be propagated to all considered STAs of users indicating which subcarriers are assigned to which users. The size of the map can be large depending on the system parameters since all individual subcarriers, which are allocated to users, have to be explicitly represented in the map for the allocated symbol durations.

Figure 3:
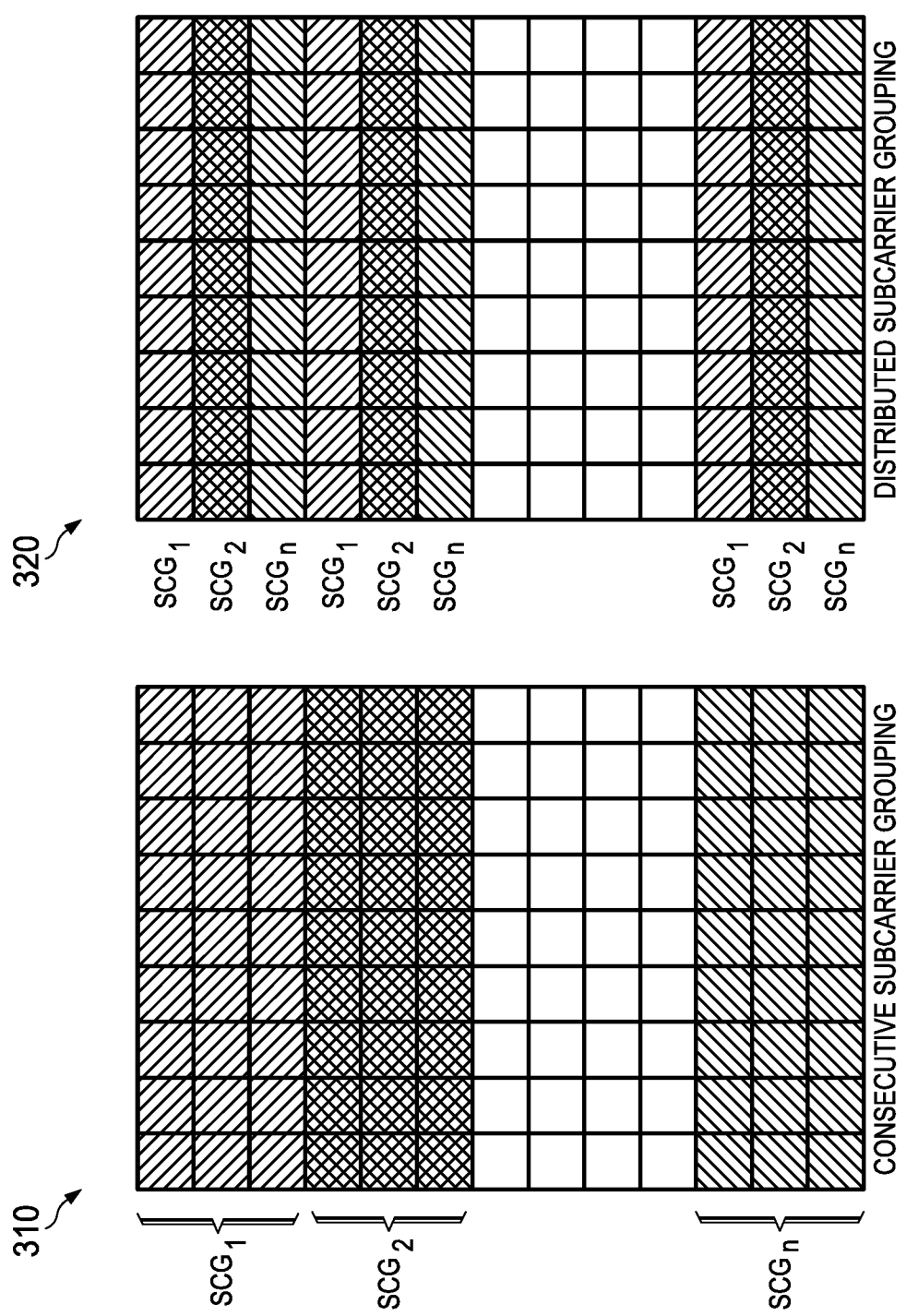
FIG. 3 illustrates embodiments of subcarrier groupings.

A more efficient scheme for assigning subcarriers in OFDMA is one that reduces the overhead related to the transmission of the map. In an embodiment, this can be achieved by providing a structured allocation of the subcarriers to users in an efficient form. This is achieved by grouping subcarriers into groups with defined structures. FIG. 3 shows two embodiments for grouping the subcarriers according to respective structures 310 and 320. In structure 310, each group that is assigned to a respective user includes a plurality of consecutive subcarriers. The groups may include equal numbers of subcarriers (e.g., 3 subcarriers at each group as shown) or different quantity of subcarriers as determined by the network. In structure 320, each group assigned to a respective user includes a plurality of subcarriers dispersed in the spectrum of available subcarriers. The selection of the subcarriers can be based on some distribution function or some deterministic criteria. The subcarriers may be dispersed by a fixed offset of subcarriers (distances between the subcarriers of a group are fixed). The groups may also include equal or different numbers of subcarriers as determined by the network. The groupings of subcarriers according to the structures 310 and 320 are not random but predefined according to any suitable deterministic criteria. The term deterministic is used herein to refer to a non-random grouping approach of the subcarriers into subcarrier groups for users. Further, the AP in the WLAN is responsible for assigning subcarriers to the different subcarrier groups. In an embodiment, this assignment is communicated to associated STAs in a capability element.

Figure 4:
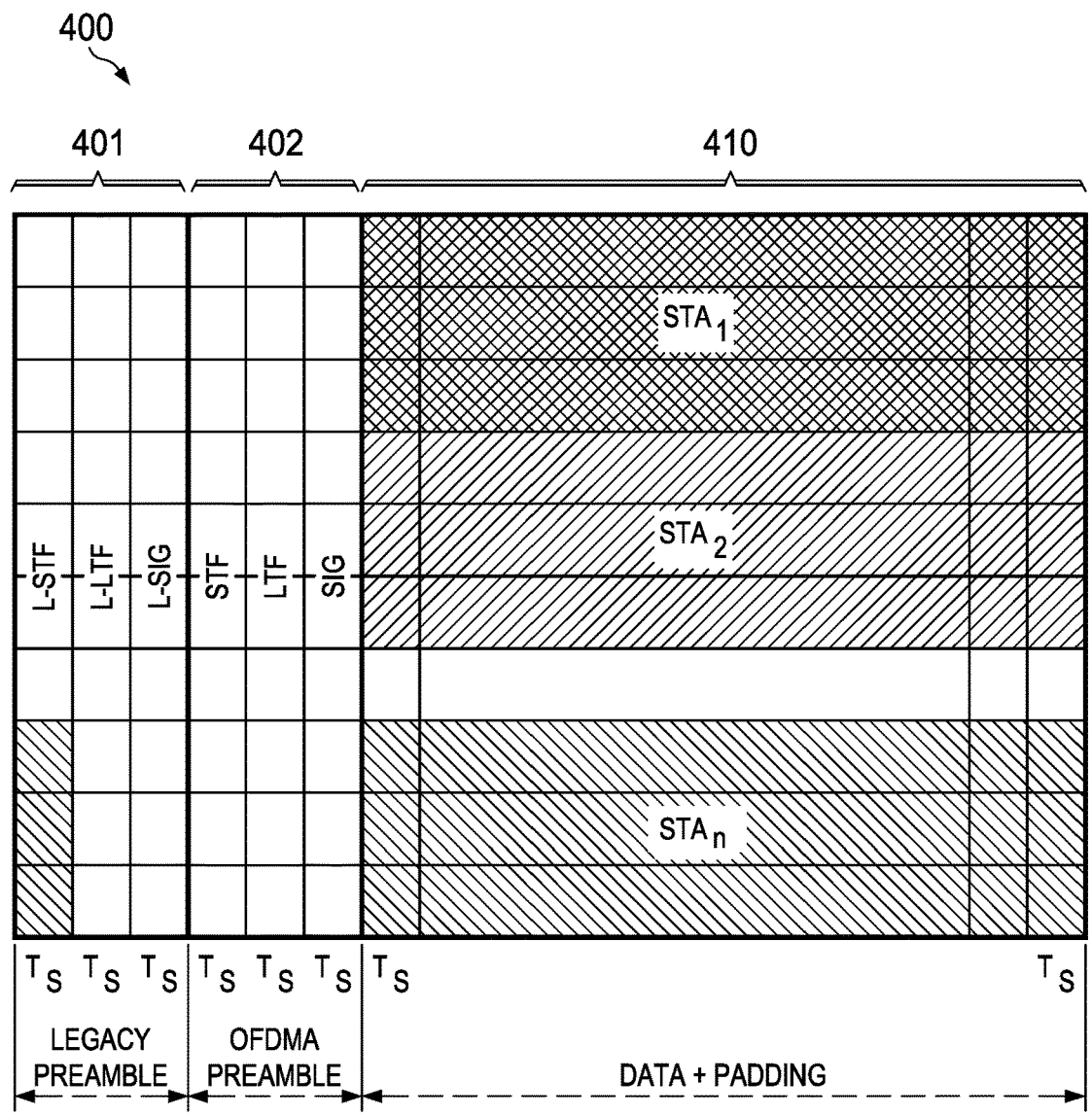
FIG. 4 illustrates an embodiment of an OFDMA physical layer (PHY) Protocol Data Unit (PPDU) for assigning subcarrier groups to users.

With the structured subcarrier grouping, the assignment of subcarriers to users can be done in predefined groups. As such, the group indices are communicated to users (STAs) rather than the explicit assignment of each subcarrier. FIG. 4 shows an embodiment of this assignment. Specifically an OFDMA physical layer (PHY) Protocol Data Unit (PPDU) 400 is used for allocating subcarrier groups to users. The OFDMA PPDU 400 is sent from a WLAN AP to the considered STAs. For instance STA 1 is assigned subcarrier group 1, STA 2 is assigned subcarrier group 2 and so on. The subcarrier groups can have structures similar to structures 310 or 320 above, or other suitable predefined structures. The OFDMA PPDU 400 comprises two types of preambles that precede a data portion 410 of the OFDMA PPDU 400. The data portion 410 carries data for the STAs, and can be padded if the amount of data is less than a maximum size of the data portion. The maximum frame length is determined by the AP or by an OFDMA Coordination Function (OCF) for managing OFDMA resources in the WLAN.

The first preamble 401 is a legacy preamble that can be used to spoof legacy WLAN users that cannot participate in the OFDMA transmission. The term legacy herein is used to indicate communications, or communications pertaining to users, that do not support OFDMA transmission. Such users need to keep silence for the duration of the OFDMA transmission. This silence duration is indicated in a Legacy Signal Field (L-SIG) of the legacy preamble. The legacy preamble is transmitted in a WLAN format that is commonly referred to as non-High Throughput (non-HT) format. The Legacy preamble also includes a Legacy Short Training Field (L-STF) and a Legacy Long Training Field (L-LTF) which can be used for the synchronization and channel estimation, respectively, of the user's data portion. When there are multiple streams, there is a need to append more LTFs after the preamble depending on the number of streams.

The format of the data portion 410 can be different than a Legacy data portion size of an OFDM frame, for instance the Fast Fourier Transform (FFT) frame size for the data portion 410 may be larger than that of the Legacy OFDM frame data portion. In this case, there is no need to use all of the subcarriers (corresponding to one OFDMA symbol) for the LTFs, that is, for training sequences. When the number of training sequences in the OFDMA PPDU 400 is less than the total subcarrier size for an OFDMA symbol, interpolation may be applied to get the channel estimation for the entire OFDMA symbol. In this case, the important OFDMA physical layer (PHY) parameters, including the downlink/uplink map between the training sequences may be carried without having a specific Signal (SIG) field for OFDMA PPDUs.

The second preamble 402 of the OFDMA PPDU 400 is an OFDMA preamble. The OFDMA preamble includes parameters that are relevant to the current transmission. These parameters include the coding type, modulation and coding scheme (MCS), frame length, and possibly other parameters. A STF and LTF can be used for the synchronization and channel estimation, respectively, of the user's data portion. An OFDMA SIG in the second preamble 402 (OFDMA preamble) may be divided into two segments, SIG A and SIG B. The segment SIG A contains general information related to the OFDMA transmission, while SIG B contains information related to each particular user. The SIG also carries the mapping of the subcarrier groups to the users.

In an embodiment, to efficiently reduce overhead for carrying the mapping information between users and subcarrier groups, a plurality of user groups are formed where each user group includes a maximum number of users, N. The number of predefined subcarrier groups is also made equal to N. For each user group, each user can be allocated one of the N subcarrier groups. Further, a user may appear in a user group more than one time to allow for the allocation of multiple subcarrier groups to a single user based on traffic requirements. Each user group is identified by a group identifier (GrpID). The GrpID needs to have a sufficient length (e.g., in number of bits) to satisfy the OFDMA design parameters, such as to allow a maximum number of users that can participate in a single OFDMA transmission. For instance, the size of the GrpID in bits is defined to allow a maximum of 4 or 8 users per user group.

Figure 5:
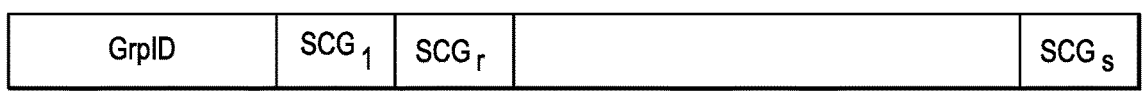
FIG. 5 illustrates an embodiment of an OFDMA mapping field for subcarrier assignment.

FIG. 5 shows an embodiment of an OFDMA mapping field for subcarrier assignment, specifically between user groups (using GrpIDs) and subcarrier groups. The OFDMA mapping field can be part of the OFDMA preamble (in the SIG field) of an OFDMA PPDU as shown in FIG. 4, and consists of a GrpID subfield and one or more subcarrier group (SCG) indices. The number of SCG indices in the OFDMA mapping field is equal to the number of users associated with the GrpID. Previous knowledge of the GrpID and the position of the user in the user group corresponding to the GrpID is sufficient to indicate which of the subcarrier groups is assigned to which user. The value of GrpID allows the user receiving the mapping field to determine the associated user group and hence the order of the users in that group. The subsequent sequence of subcarrier groups ($SCG_1$, $SCG_2$, . . . , $SCG_s$) in the mapping field provides the mapping of the subcarrier groups with the users in the group indicated by the GrpID value, where the number of the indicated subcarrier groups is equal to the number of users in the indicated group. The mapping is hence a one to one mapping between the sequence of users in the group and the sequence of indicated subcarrier groups is used. In addition to the saving in the overhead related to the map transmission, this mapping approach allows for the selection of a different group of users, as indicated by the GrpID, per OFDMA transmission.

Figure 6:
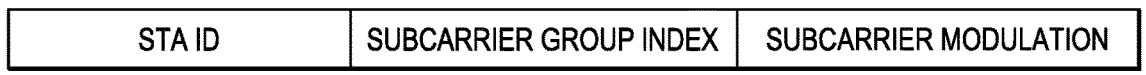
FIG. 6 illustrates an embodiment of an OFDMA mapping information element (IE) for subcarrier assignment.

FIG. 6 shows an embodiment of another mapping approach using an OFDMA mapping information element (IE) for subcarrier assignment. In this approach, the transmission of the mapping information can be done using management frames by defining an IE as shown. The OFDMA mapping IE associates a STA ID (or a user ID) with a subcarrier group index. The STA ID can be a MAC address or an association ID (AID) assigned by the AP to the STA during association. Since an IE may have more bits than needed for the mapping, other subcarrier information such as modulation and coding information may also be included in the IE. While more information can be transported using this approach, users participating in the OFDMA TXOP may be limited to a fixed set of users during the entire TXOP.

Figure 7:
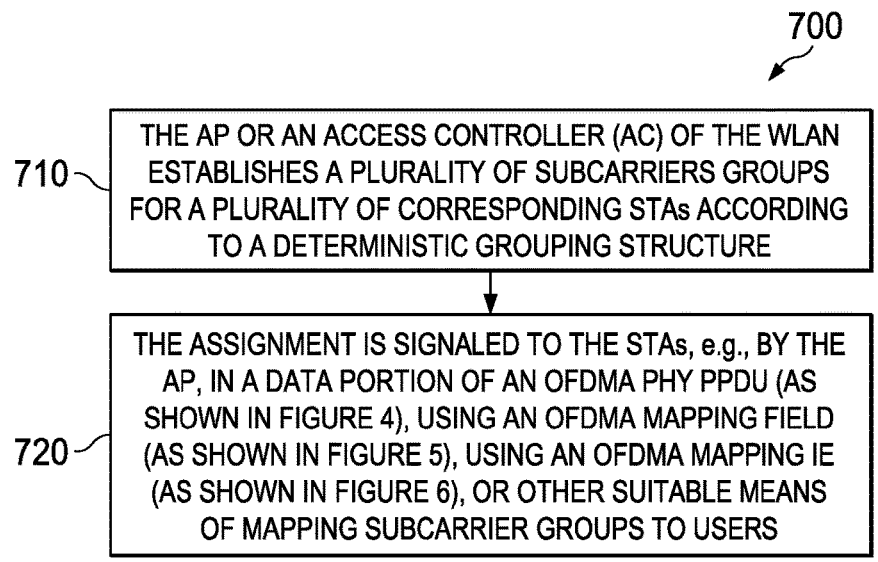
FIG. 7 illustrates an embodiment of a method for assigning subcarrier groups to users in OFDMA WLAN.

FIG. 7 shows an embodiment of a method 700 for assigning subcarrier groups to users in OFDMA WLANs. At step 710, the AP or an access controller (AC) of the WLAN establishes a plurality of subcarrier groups for a plurality of corresponding STAs according to a deterministic grouping structure. For instance, a plurality of consecutive subcarriers in an available bandwidth of subcarriers (e.g., 20 MHz) is designated for each group that corresponds to a user, e.g., similar to the structure 310 above. Alternatively, for each STA, the subcarriers are distributed in the bandwidth such as no consecutive subcarriers are assigned to an STA. At step 720, the assignment is signaled to the STAs, e.g., by the AP, in a data portion of an OFDMA PHY PPDU (as shown in FIG. 4), using an OFDMA mapping field (as shown in FIG. 5), using an OFDMA mapping IE (as shown in FIG. 6), or other suitable means of mapping subcarrier groups to users. In the case of using the data portion of the OFDMA PHY PPDU, the mapping between STAs and SCGs can be explicit. In the case of using the OFDMA mapping field, the mapping is between user group IDs and a sequence of SCGs, as described above. In the case of using the OFDMA mapping IE, each user STA is explicitly mapped to a predefined subcarrier group by signaling the STA ID and the subcarrier group index. When a STA or user device receives the assignment, the STA can use this information to decide which subcarrier group is assigned to it, and hence determine the subcarriers belonging to that subcarrier group for exchanging OFDMA communications.

Figure 8:
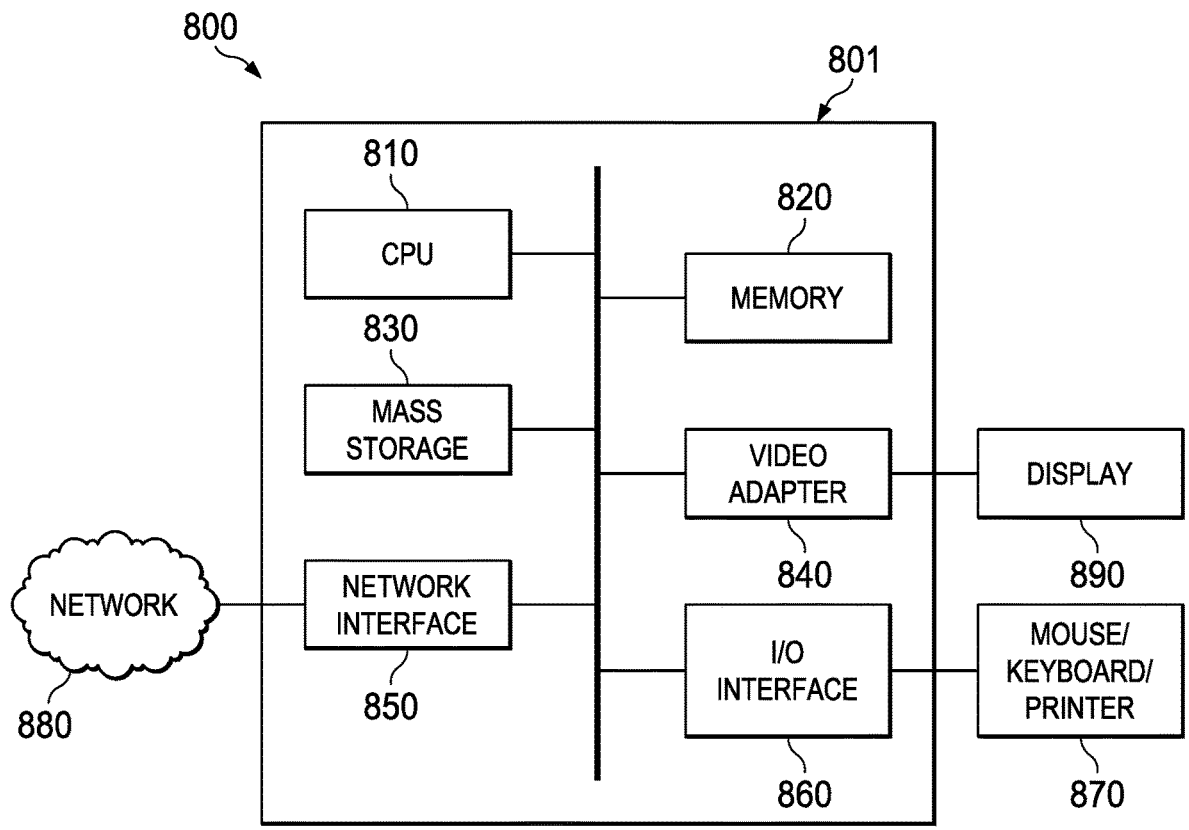
FIG. 8 is a diagram of a processing system that can be used to implement various embodiments.

FIG. 8 is a block diagram of a processing system 800 that can be used to implement various embodiments. For instance the processing system 800 can be part of an AP, a STA, or an AC in a WLAN. Specific devices may utilize all of the components shown, or only a subset of the components, and levels of integration may vary from device to device. Furthermore, a device may contain multiple instances of a component, such as multiple processing units, processors, memories, transmitters, receivers, etc. The processing system 800 may comprise a processing unit 801 equipped with one or more input/output devices, such as a speaker, microphone, mouse, touchscreen, keypad, keyboard, printer, display, and the like. The processing unit 801 may include a central processing unit (CPU) 810, a memory 820, a mass storage device 830, a video adapter 840, and an I/O interface 860 connected to a bus. The bus may be one or more of any type of several bus architectures including a memory bus or memory controller, a peripheral bus, a video bus, or the like.

The CPU 810 may comprise any type of electronic data processor. The memory 820 may comprise any type of system memory such as static random access memory (SRAM), dynamic random access memory (DRAM), synchronous DRAM (SDRAM), read-only memory (ROM), a combination thereof, or the like. In an embodiment, the memory 820 may include ROM for use at boot-up, and DRAM for program and data storage for use while executing programs. In embodiments, the memory 820 is non-transitory. The mass storage device 830 may comprise any type of storage device configured to store data, programs, and other information and to make the data, programs, and other information accessible via the bus. The mass storage device 830 may comprise, for example, one or more of a solid state drive, hard disk drive, a magnetic disk drive, an optical disk drive, or the like.

The video adapter 840 and the I/O interface 860 provide interfaces to couple external input and output devices to the processing unit. As illustrated, examples of input and output devices include a display 890 coupled to the video adapter 840 and any combination of mouse/keyboard/printer 870 coupled to the I/O interface 860. Other devices may be coupled to the processing unit 801, and additional or fewer interface cards may be utilized. For example, a serial interface card (not shown) may be used to provide a serial interface for a printer.

The processing unit 801 also includes one or more network interfaces 850, which may comprise wired links, such as an Ethernet cable or the like, and/or wireless links to access nodes or one or more networks 880. The network interface 850 allows the processing unit 801 to communicate with remote units via the networks 880. For example, the network interface 850 may provide wireless communication via one or more transmitters/transmit antennas and one or more receivers/receive antennas. In an embodiment, the processing unit 801 is coupled to a local-area network or a wide-area network for data processing and communications with remote devices, such as other processing units, the Internet, remote storage facilities, or the like.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method for communication in a wireless local area network (WLAN), the method comprising:
   transmitting, by a network component, a physical layer (PHY) protocol data unit (PPDU), the PPDU comprising:
      a legacy preamble, the legacy preamble comprising a legacy short training field (L-STF) and a legacy long training field (L-LTF) in a legacy format, and
      a non-legacy part comprising a second long training field (LTF), wherein a bandwidth of the PPDU comprises: 64 subcarriers per 20 MHz in the legacy preamble, and 256 or more subcarriers per 20 MHz in the non-legacy part, the second LTF being used for channel estimation for a data transmission or a sounding packet transmission, and every N-th subcarrier of a symbol of the second LTF being used for the channel estimation, wherein N is a natural number bigger than 1.

2. The method of claim 1, wherein 64 subcarriers of 256 subcarriers of the symbol of the second LTF are used for the channel estimation.

3. The method of claim 1, the PPDU comprising first information for mapping one or more predefined subcarrier groups to one or more stations (STAs) and second information of one or more streams scheduled for each STA,
   wherein each subcarrier group of the predefined subcarrier groups is a part of the bandwidth with a size representing a number of subcarriers in each subcarrier group and with a location where the part of the bandwidth is located within the bandwidth.

4. The method of claim 3, wherein at least a first size and a second size are predefined for the predefined subcarrier groups, and wherein the first size is an integer multiple of the second size.

5. The method of claim 3, wherein the PPDU comprises a SIG field, wherein the SIG field comprises the first information and the second information, and wherein the mapping is indicated by a sequence of subcarrier groups and a sequence of STAs.

6. The method of claim 3, wherein the non-legacy part further comprises a data portion, wherein the data portion comprises the first information, and wherein the mapping is indicated by a sequence of sub-mapping fields, each sub-mapping field of the sequence of sub-mapping fields comprising a STA identifier (ID) and a subcarrier group index.

7. An apparatus for communication in a wireless local area network (WLAN), the apparatus comprising:
   a non-transitory memory storage comprising instructions; and
   one or more processors in communication with the non-transitory memory storage, wherein the one or more processors execute the instructions to:
      transmit a physical layer (PHY) protocol data unit (PPDU), the PPDU comprising:
         a legacy preamble, the legacy preamble comprising a legacy short training field (L-STF) and a legacy long training field (L-LTF) in a legacy format, and
         a non-legacy part comprising a second long training field (LTF), wherein a bandwidth of the PPDU comprises: 64 subcarriers per 20 MHz in the legacy preamble, and 256 or more subcarriers per 20 MHz in the non-legacy part, the second LTF being used for channel estimation for a data transmission or a sounding packet transmission, and every N-th subcarrier of a symbol of the second LTF being used for the channel estimation, wherein N is a natural number bigger than 1.

8. The apparatus of claim 7, wherein 64 subcarriers of 256 subcarriers of the symbol of the second LTF are used for the channel estimation.

9. The apparatus of claim 7, the PPDU comprising first information for mapping one or more predefined subcarrier groups to one or more stations (STAs) and second information of one or more streams scheduled for each STA,
wherein each subcarrier group of the predefined subcarrier groups is a part of the bandwidth with a size representing a number of subcarriers in each subcarrier group and with a location where the part of the bandwidth is located within the bandwidth.

10. The apparatus of claim 9, wherein at least a first size and a second size are predefined for the predefined subcarrier groups, and wherein the first size is an integer multiple of the second size.

11. The apparatus of claim 9, wherein the PPDU comprises a SIG field, wherein the SIG field comprises the first information and the second information, and wherein the mapping is indicated by a sequence of subcarrier groups and a sequence of STAs.

12. The apparatus of claim 9, wherein the non-legacy part further comprises a data portion, wherein the data portion comprises the first information, and wherein the mapping is indicated by a sequence of sub-mapping fields, each sub-mapping field of the sequence of sub-mapping fields comprising a STA identifier (ID) and a subcarrier group index.

13. A method for communication in a wireless local area network (WLAN), the method comprising:
receiving, by a station (STA), a physical layer (PHY) protocol data unit (PPDU), the PPDU comprising:
a legacy preamble, the legacy preamble comprising a legacy short training field (L-STF) and a legacy long training field (L-LTF) in a legacy format, and,
a non-legacy part comprising a second long training field (LTF); and
processing, by the STA, the PPDU, the processing comprising:
obtaining the legacy preamble on 64 subcarriers per 20 MHz in a bandwidth of the PPDU;
obtaining the non-legacy part on 256 or more subcarriers per 20 MHz in the bandwidth of the PPDU; and
using the second LTF for channel estimation for a data transmission or a sounding packet transmission, every N-th subcarrier of a symbol of the second LTF being used for the channel estimation, wherein N is a natural number bigger than 1.

14. The method of claim 13, wherein the using the second LTF for the channel estimation comprises:
using 64 subcarriers of 256 subcarriers of the symbol of the second LTF for the channel estimation.

15. The method of claim 13, the PPDU comprising first information for mapping one or more predefined subcarrier groups to one or more stations (STAs) and second information of one or more streams scheduled for each STA,
wherein each subcarrier group of the predefined subcarrier groups is a part of the bandwidth with a size representing a number of subcarriers in each subcarrier group and with a location where the part of the bandwidth is located within the bandwidth.

16. The method of claim 15, wherein at least a first size and a second size are predefined for the predefined subcarrier groups, and wherein the first size is an integer multiple of the second size.

17. The method of claim 15, wherein the PPDU comprises a SIG field, wherein the SIG field comprises the first information and the second information, and wherein the mapping is indicated by a sequence of subcarrier groups and a sequence of STAs.

18. The method of claim 15, wherein the non-legacy part further comprises a data portion, wherein the data portion comprises the first information, and wherein the mapping is indicated by a sequence of sub-mapping fields, each sub-mapping field of the sequence of sub-mapping fields comprising a STA identifier (ID) and a subcarrier group index.

19. An apparatus supporting communication in a wireless local area network (WLAN), the apparatus comprising:
a non-transitory memory storage comprising instructions; and
one or more processors in communication with the non-transitory memory storage, wherein the one or more processors execute the instructions to:
receive a physical layer (PHY) protocol data unit (PPDU), the PPDU comprising:
a legacy preamble, the legacy preamble comprising a legacy short training field (L-STF) and a legacy long training field (L-LTF) in a legacy format, and,
a non-legacy part comprising a second long training field (LTF); and
process the PPDU by:
obtaining the legacy preamble on 64 subcarriers per 20 MHz in a bandwidth of the PPDU;
obtaining the non-legacy part on 256 or more subcarriers per 20 MHz in the bandwidth of the PPDU; and
using the second LTF for channel estimation for a data transmission or a sounding packet transmission, every N-th subcarrier of a symbol of the second LTF being used for the channel estimation, wherein N is a natural number bigger than 1.

20. The apparatus of claim 19, wherein the instructions to use the second LTF for the channel estimation comprise instructions to:
use 64 subcarriers of 256 subcarriers of the symbol of the second LTF for the channel estimation.

21. The apparatus of claim 19, the PPDU comprising first information for mapping one or more predefined subcarrier groups to one or more stations (STAs) and second information of one or more streams scheduled for each STA,
wherein each subcarrier group of the predefined subcarrier groups is a part of the bandwidth with a size representing a number of subcarriers in each subcarrier group and with a location where the part of the bandwidth is located within the bandwidth.

22. The apparatus of claim 21, wherein at least a first size and a second size are predefined for the predefined subcarrier groups, and wherein the first size is an integer multiple of the second size.

23. The apparatus of claim 21, wherein the PPDU comprises a SIG field, wherein the SIG field comprises the first information and the second information, and wherein the mapping is indicated by a sequence of subcarrier groups and a sequence of STAs.

24. The apparatus of claim 21, wherein the non-legacy part further comprises a data portion, wherein the data portion comprises the first information, and wherein the mapping is indicated by a sequence of sub-mapping fields, each sub-mapping field of the sequence of sub-mapping fields comprising a STA identifier (ID) and a subcarrier group index.

* * * * *